United States Patent
Kori et al.

(10) Patent No.: US 7,231,042 B2
(45) Date of Patent: Jun. 12, 2007

(54) SIGNAL TRANSMISSION APPARATUS AND SIGNAL TRANSMISSION METHOD

(75) Inventors: Teruhiko Kori, Kanagawa (JP); Noriko Ninoseki, Tokyo (JP)

(73) Assignee: Sony Corporation, Tokyo (JP)

( * ) Notice: Subject to any disclaimer, the term of this patent is extended or adjusted under 35 U.S.C. 154(b) by 815 days.

(21) Appl. No.: 09/796,908

(22) Filed: Feb. 28, 2001

(65) Prior Publication Data

US 2001/0037307 A1    Nov. 1, 2001

(30) Foreign Application Priority Data

Feb. 29, 2000   (JP) .................. P2000-054224

(51) Int. Cl.
| | |
|---|---|
| H04N 7/167 | (2006.01) |
| G06F 11/30 | (2006.01) |
| G06F 12/14 | (2006.01) |
| H04L 9/32 | (2006.01) |
| G06F 7/04 | (2006.01) |
| G06F 17/30 | (2006.01) |
| G06K 9/00 | (2006.01) |
| H03M 1/68 | (2006.01) |
| H04K 1/00 | (2006.01) |

(52) U.S. Cl. .............. 380/201; 380/203; 386/94; 386/46; 386/96; 386/37; 360/50; 713/189; 713/151; 713/153; 713/165; 726/26; 726/31; 726/32; 726/33

(58) Field of Classification Search ............. 380/201, 380/203, 10, 20, 16; 386/94, 46, 96, 37; 360/60; 713/189, 151, 153, 165, 200, 201; 369/53.2; 726/26, 31–33

See application file for complete search history.

(56) References Cited

U.S. PATENT DOCUMENTS 5,315,448 A  *  5/1994  Ryan .................. 360/60

(Continued)

FOREIGN PATENT DOCUMENTS

EP         0 830 024 A2     3/1998

(Continued)

OTHER PUBLICATIONS

DDWG, Digital Visual Interface DVI, Apr. 2, 1999, Revision 1.0, pp. 46-47.*

Primary Examiner—Ayaz Sheikh
Assistant Examiner—Shin-Hon Chen
(74) Attorney, Agent, or Firm—Bell, Boyd & Lloyd LLP (57) ABSTRACT

Copyright of contents to be transmitted may be protected for an analog signal produced by converting a digital signal representative of the contents. A signal transmission apparatus determines whether the contents are protected by copyright by detecting copyright protection information of a digital image signal of the contents at a protection information detecting unit, and scrambles an analog image signal converted from the digital image signal to output when the copyright is protected, or prohibits outputting of the analog image signal. When a receiving apparatus receives a transmitted signal, the apparatus generates a digital image signal and the analog image signal based on the transmitted signal. When the authentication processing unit of the receiving apparatus has determined that the copyright has been protected through communication between an authentication processing unit of the transmission apparatus and that of the receiving apparatus, the unit scrambles the analog image signal to output, or prohibits outputting thereof, or superimposes a-copy-guard signal on the image signal to output.

22 Claims, 10 Drawing Sheets

U.S. PATENT DOCUMENTS

| | | | |
|---|---|---|---|
| 5,349,641 A * | 9/1994 | Coutrot et al. | 380/241 |
| 5,459,583 A | 10/1995 | Nakata | |
| 5,627,655 A | 5/1997 | Okamoto et al. | |
| 5,778,064 A * | 7/1998 | Kori et al. | 380/203 |
| 6,243,530 B1 * | 6/2001 | Kato | 386/94 |
| 6,404,889 B1 * | 6/2002 | Ryan et al. | 380/201 |
| 6,473,560 B1 * | 10/2002 | Linnartz et al. | 386/94 |
| 6,668,324 B1 * | 12/2003 | Mangold et al. | 713/189 |
| 6,707,774 B1 * | 3/2004 | Kuroda et al. | 369/53.21 |

FOREIGN PATENT DOCUMENTS

| | | |
|---|---|---|
| EP | 1146329 | 5/1999 |
| JP | 10-63599 | 3/1998 |
| JP | 10-124998 | 5/1998 |

* cited by examiner

| PIN | SIGNAL NAME | PIN | SIGNAL NAME | PIN | SIGNAL NAME |
|---|---|---|---|---|---|
| 1 | TMDS DATA2− | 9 | TMDS DATA1− | 17 | TMDS DATA0− |
| 2 | TMDS DATA2+ | 10 | TMDS DATA1+ | 18 | TMDS DATA0+ |
| 3 | TMDS DATA2/4 SHIELD | 11 | TMDS DATA1/3 SHIELD | 19 | TMDS DATA0/5 SHIELD |
| 4 | TMDS DATA4− | 12 | TMDS DATA3− | 20 | TMDS DATA5− |
| 5 | TMDS DATA4+ | 13 | TMDS DATA3+ | 21 | TMDS DATA5+ |
| 6 | DDC CLOCK | 14 | +5V POWER | 22 | TMDS CLOCK SHIELD |
| 7 | DDC DATA | 15 | GROUND | 23 | TMDS CLOCK+ |
| 8 | ANALOG V. SYNC | 16 | HOT PLUG DETECT | 24 | TMDS CLOCK− |
| C1 | ANALOG RED | C2 | ANALOG GREEN | C3 | ANALOG BLUE |
| C4 | ANALOG H. SYNC | C5 | ANALOG GROUND | | |

SIGNAL TRANSMISSION APPARATUS AND SIGNAL TRANSMISSION METHOD

BACKGROUND OF THE INVENTION

1. Field of the Invention

The present invention relates to a signal transmission apparatus and method, and, more specifically, it relates to an apparatus and method which transmits a digital signal representative of contents of information as well as converts the digital signal to an analog signal to output, or transmits the analog signal together with the digital signal to determine whether the contents are protected by copyright, and performs copyright protection operation for the analog signal when the contents are determined as protected by copyright.

2. Description of the Prior Art

Conventionally, with respect to a computer device or the like, a digital image signal was converted to an analog image signal and was supplied to a display device by an analog transmission. However, with the widespread use of the display device which drives a display unit with the digital signal, for example a liquid crystal display, a digital transmission method without converting the digital image signal to the analog signal has been standardized to prevent from degradation of image quality and to cut costs or the like. For instance, DVI (Digital Visual Interface, Version 1.0) Standard is worked out by DDWG (Digital Display Working Group). According to the DVI Standard, a digital three primary-color image signal is serially transmitted color-by-color by base-band using a transmission line of TMDS (Transition Minimized Differential Signals) developed by Silicon Image Corporation in U.S.A.

Additionally, with the development of information processing technology, it is being possible to digitize various information of an image or a voice or the like and handle them integrally. For instance, information of a movie, music or the like is digitized and a system of distributing such digitized information among users via communication network is also in practical use.

As such, when various information is digitized and distributed, exact duplicates are easily and inexhaustibly made because information to be distributed is digitized. This provides users with much advantage but presents a problem with respect to protection of legal right on the part of offering works or publications. As a technology for protecting a copyright of digital data, there is the one which is disclosed in Japanese Unexamined Patent Application Publication No. 10-124998, and a technology for controlling output by using terminal information of a terminal unit is disclosed in Japanese Unexamined Patent Application Publication No. 10-63599. Furthermore, regarding the digital image signal to be transmitted by the DVI Standard, a proposal, referred to as DVI-CP (Content Protect)including encryption technology for copyright protection, is made by Intel Corporation in U.S.A.

According to the DVI Standard, not only the TMDS transmission line but also the analog transmission line are established so as to be capable of connecting the display device corresponding to the conventional analog transmission. Therefore, it is necessary that copyright protection should be made for not only the digital image signal transmitted by digital but also the analog image signal.

In addition, the DVI Standard assumes transmission of the image signal between the computer device and the display device. Devices connectable by the DVI Standard, however, are not limited to the computer device and the display device, but a set-top box unit or a television set may be connected. There are many cases where such consumer-electronics products demand a function capable of transmitting the supplied image signal to the other devices. For instance, the television set not only displays the image based on the digital image signal supplied from the set-top box unit, but also has a function of converting the digital image signal to the analog image signal to output so that the displayed image may be recorded in a video tape-recorder. Such being the case, for the apparatus having a function of outputting such analog image signal, copyright protection should also be made for the outputted analog image signal. Otherwise, practical effect of copyright protection may not be exerted.

SUMMARY OF THE INVENTION

Therefore, an object of the present invention is to provide the signal transmission apparatus and the signal transmission method capable of protecting a copyright of contents of information transmitted in a form of digital signal, and of the contents represented in a form of analog signal generated by converting the digital signal. A signal transmission apparatus relating to this invention is the one that transmits a digital signal of contents as well as converts the digital signal to an analog signal to output, or transmits the analog signal together with digital signal. This apparatus has a protection detecting part to determine whether the contents are protected by copyright, and has a copyright protecting part to perform copyright protection operation for the analog signal when the contents are determined as protected by copyright based on the result of detection conducted by an information detecting part. Additionally, the copyright protecting part has a scrambling part to conduct scrambling processing for the analog signal. The copyright protecting part outputs or transmits the analog signal scrambled by the scrambling part when the contents are determined as protected by copyright by the protection detecting part.

A signal transmission method is the one that determines whether the contents are protected by copyright when transmitting the digital signal of the contents. When the contents are determined as protected by copyright, it performs a copyright protection operation for the analog signal on the occasion of outputting the analog signal produced by a conversion of the digital signal or transmitting the analog signal together with the digital signal.

According to the present invention, the signal transmission apparatus transmits the digital signal of the contents as well as converts the digital signal to the analog signal to output, or transmits the analog signal together with the digital signal to determine whether the contents are protected by copyright, and outputs or transmits the scrambled analog signal when the contents are determined as protected by copyright, or otherwise prohibits outputting or transmitting the analog signal. Determination of whether the contents are protected by copyright is made by retrieving copyright protection information embedded in the digital signal, or by retrieving copyright protection information multiplexed during the blanking period while the digital signal is still an image signal. When a protection operating control signal to control a copyright protection operation for the analog signal is transmitted as copyright protection information, the contents are determined as protected by copyright. Furthermore, determination of whether the contents are protected by copyright is made according to copyright protection information transmitted via a signal line different from that of the digital signal. When information indicating that the digital signal of the contents is encrypted is regarded as copyright protection information, the contents are determined as protected by copyright. In addition, when the digital signal of the contents is the image signal, the image signal is converted to an analog composite video signal, and when the contents are determined as protected by copyright, a copy-guard signal is superimposed on the composite video signal.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
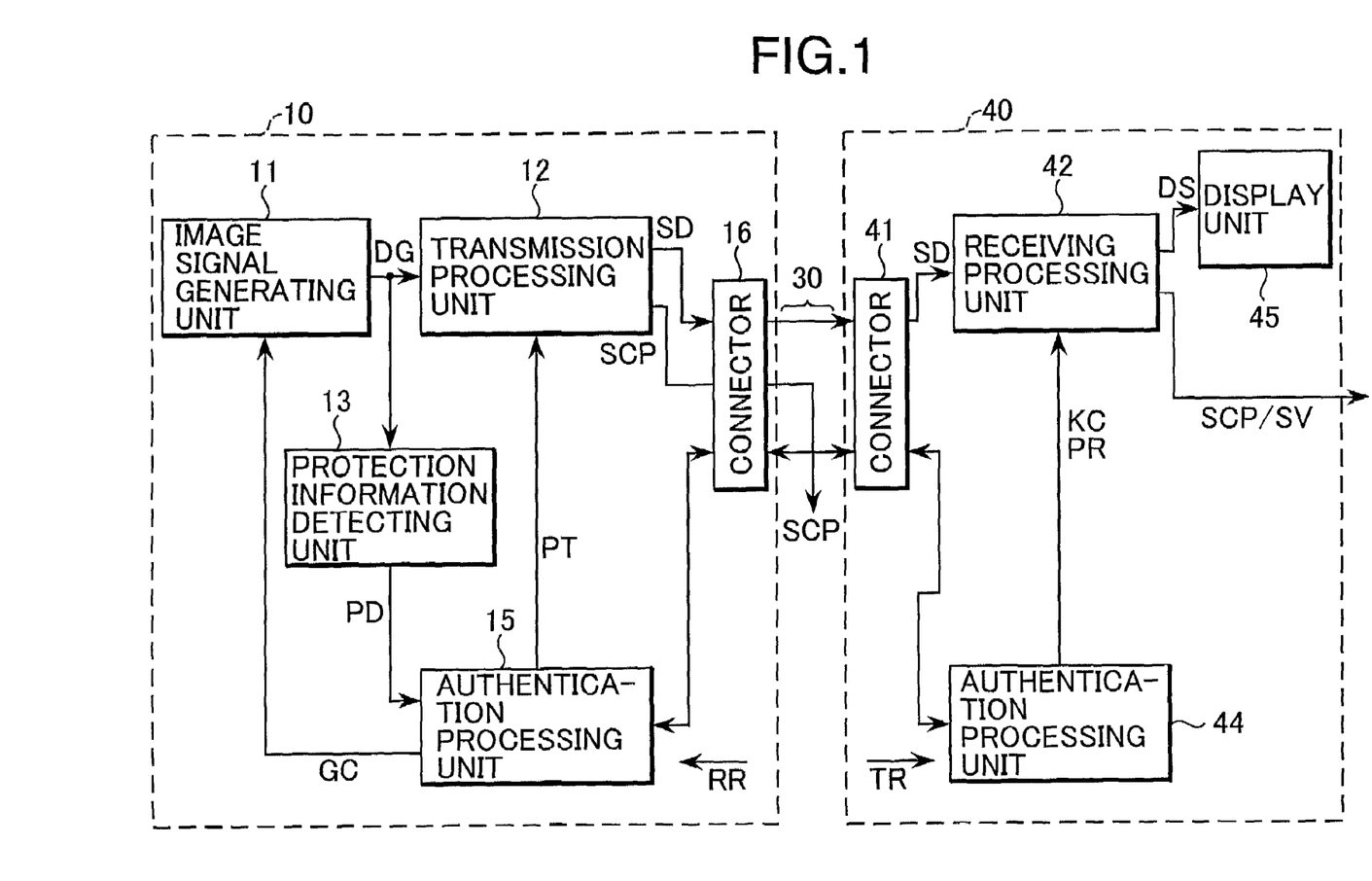
FIG. 1 is a conceptual view showing a signal transmission system.

Referring to the following drawings, embodiments of this invention are described in detail. FIG. 1 is a conceptual view of a signal transmission system including a transmitting apparatus 10 and a receiving apparatus 40 in-between signals of contents are bi-directionally transmitted using a transmission line of the DVI Standard. A transmitting apparatus (for example, a computer device, a set-top box unit or the like) 10 and a receiving apparatus (a display device, a television set or the like) 40 are connected via transmission lines 30 of the DVI Standard. The DVI Standard transmission line includes not only the TMDS transmission line for transmitting a digital image signal but also a bi-directional transmission line for transmitting information under DDC (Display Data Channel) Specification on plug and play worked out by VESA (Video Electronics Standard Association), and a power source line as well as a signal line to detect a hot plug. Furthermore, it is considered to be possible for the DVI Standard transmission line to set up a transmission line for an analog image signal.

Figure 2:
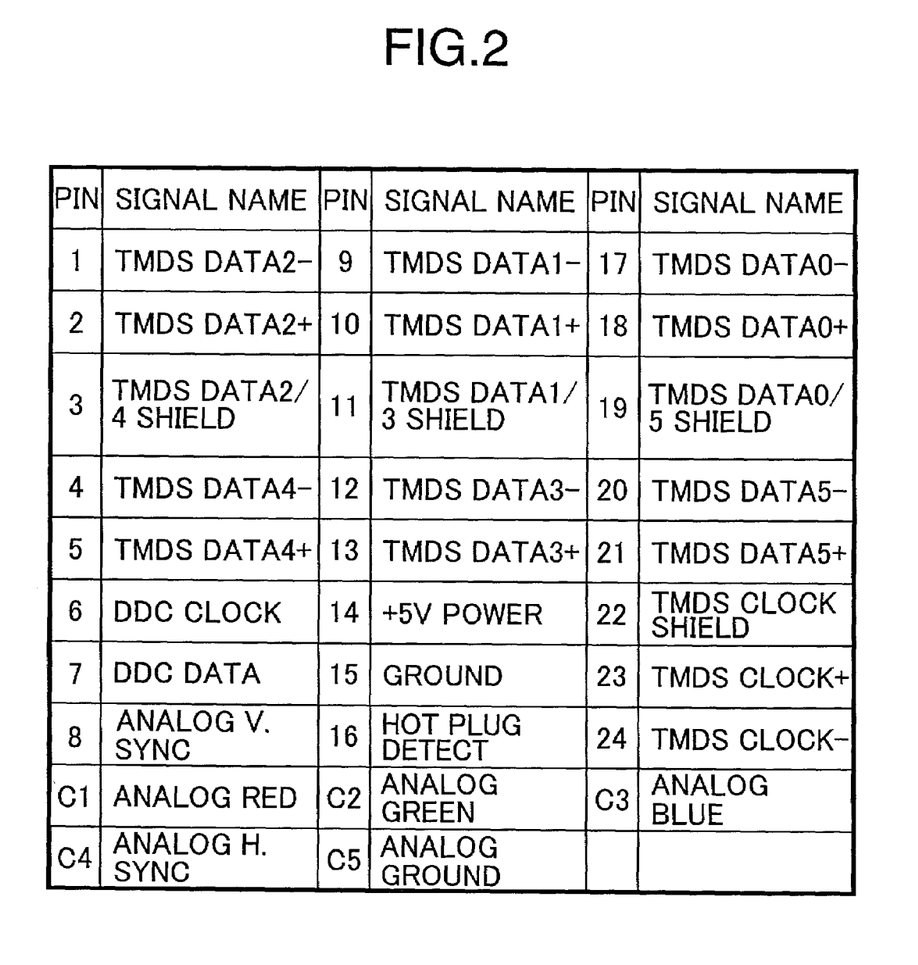
FIG. 2 is a pin configuration of connectors according to the DVI Standard.

FIG. 2 is a pin configuration of connectors of the DVI Standard, showing the case where a transmission line for the analog image signal is established.

Referring to FIG. 2, pins 1 to 5, 9 to 13 and 17 to 24 are for the TMDS transmission line, pins 6 and 7 are for the bi-directional transmission line under DDC Specification (IZC bus), pins C1 to C5 are for a transmission line for the analog image signal, pins 14 and 15 are for a 5V power source line and a ground line respectively, and a pin 16 is for a signal line to detect the hot plug.

According to a signal generation control signal GC supplied from an authentication processing unit 15 (to be described later), an image signal generating unit 11 in a transmitting apparatus 10 shown in FIG. 1 generates a serial image signal DG of the contents with the optimum resolutions and colors for a receiving apparatus 40, and supplies to a transmission processing unit 12 and to a protection information detecting unit 13.

According to a protection operating control signal PT supplied from the authentication processing unit 15, the transmission processing unit 12 operates encryption or scramble processing of the serial image signal DG to be supplied to the receiving apparatus 40 as the need arises, and converts the serial image signal DG to a serial transmission signal SD suitable for transmitting and to an analog three primary-color image signal SCP to supply to a connector 16 of the DVI Standard.

In the protection information detecting unit 13, the serial image signal DG of the contents is checked if it has copyright protection information. By this copyright protection information, the detecting unit 13 determines whether copy-protect should be conducted, and supplies the authentication processing unit 15 with a determination signal PD indicating whether the serial image signal DG of the contents is copy protected. This copyright protection information may be a CGMS (Copy Generation Management System) information, which is used in an APS (Analog Protection System) signal for protecting copyright for the analog image signal as well as in the analog signal or the digital signal and indicates whether the contents are copy-free or copy-prohibited or only one-time copy is allowed, or a CC1 (Copy Control Information) information or the like.

The authentication processing unit 15 is connected to the connector 16, communicates with the receiving apparatus 40 via the bi-directional transmission line of a transmission line 30 and determines a type of connected receiving apparatus using apparatus information RR supplied from the receiving apparatus 40. Additionally, this unit 15, according to the result of the above determination, generates the signal generation control signal GC so that the serial image signal DG suitable for the receiving apparatus 40 may be generated by the image signal generating unit 11, and supplies to the image signal generating unit 11. Furthermore, when copy-protect is determined to be conducted for the serial image signal DG of the contents according to the determination signal PD supplied from the protection information detecting unit 13, this unit 15 generates the protection operating control signal PT to control operation of encryption for the serial image signal DG or of scramble processing or the like for the analog three primary-color image signals SCP transmitted by the transmission processing unit 12, and supplies to the transmission processing unit 12.

To a connector 41 of the DVI Standard in the receiving apparatus 40 a receiving processing unit 42 and an authentication processing unit 44 are connected. The receiving processing unit 42 generates a serial image signal DS according to the received serial transmission signal SD and supplies to a display unit 45. In the display unit 45 the image of the contents is displayed in accordance with resolutions and the number of colors of the display unit 45. The receiving processing unit 42 generates the analog three primary-color image signal SCP or a composite video signal SV of the NTSC system or the 30 like and outputs to exterior apparatus (not shown). Furthermore, when the image signal produced by receiving the serial transmission signal SD supplied from the transmission apparatus 10 is encrypted, the receiving processing unit 42 decodes (decrypts) the image signal using an encryption key KC supplied from the authentication processing unit 44, restores to the serial image signal DS which is not encrypted and supplies to the display unit 45. In addition, when the image signal is encrypted or the signal which operates copyright protection for the analog image signal is superimposed on the serial transmission signal SD, the receiving processing unit 42 operates scramble processing or the like on the occasion of generating the analog three primary-color image signal SCP, or superimposes a copy-guard signal SP on the composite video signal SV, or suspends outputting of the analog signal.

The authentication processing unit 44 communicates with the authentication processing unit 15 of the transmitting apparatus 10 via the bi-directional transmission line, and supplies the authentication processing unit 15 with apparatus information, for example, information on the names of the models or on resolutions, which enables to determine, as described above, an apparatus type of the receiving apparatus 40. The receiving apparatus 40 has the unique encryption key KC, and when transmission information TR supplied from the authentication processing unit 15 indicates that the serial transmission signals SD is the encrypted signal, the receiving apparatus 40 supplies the receiving processing unit 42 with the encryption key KC. The authentication processing unit 44 generates a protection operating control signal PR to control operation at the receiving processing unit 42.

Figure 3:
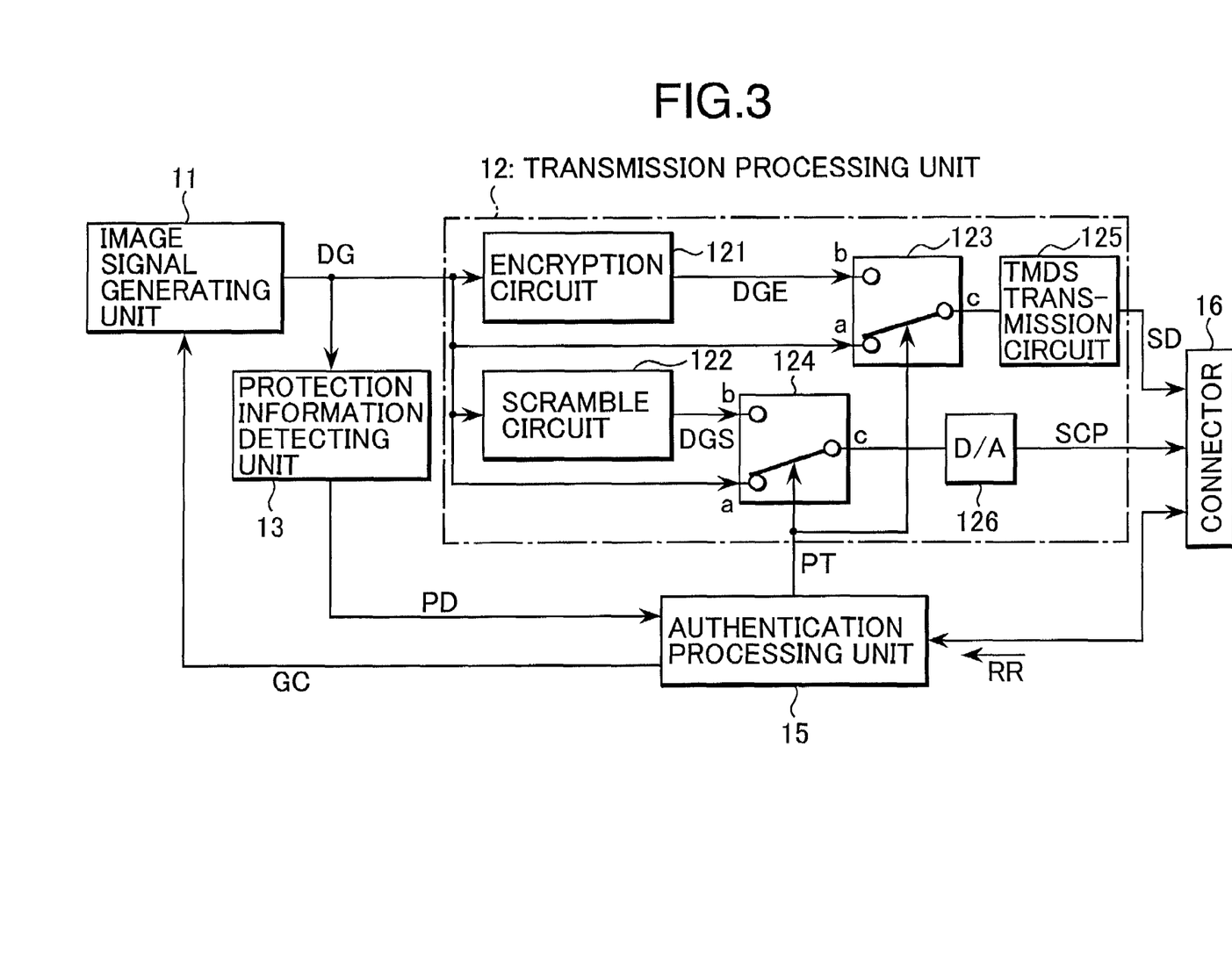
FIG. 3 is a view showing a first configuration of the transmitting apparatus.

Referring to FIG. 3, there is described a first configuration of the transmitting apparatus 10. The serial image signal DG of the contents generated at the image signal generating unit 11 is provided to an encryption circuit 121, a scramble circuit 122 and terminals a of signal selection circuits 123, 124 in the transmission processing unit 12. The encryption circuit 121 encrypts the serial image signal DG by using the encryption key KC with application of, for example, shared key encryption system, and provides to a terminal b of the signal selection circuit 123 as a serial image signal DGE. The scramble circuit 122 operates scramble processing for the serial image signal DG, and provides to a terminal b of the signal selection circuit 124 as the serial image signal DGS. This scramble processing is performed such as to reverse the polarity of the image signal by the line during the blanking period in accordance with the predetermined pattern, or to transpose time-shared the three primary-color signal by the line, or to displace the image left and right by the line, or to change the order of scanning lines by transposing the image signal by the line, whereby the details of the image of the contents may not be determined. Further, on the occasion of correctly displaying the image of the contents after receiving the scrambled image signal, mutual authentication should be conducted between the transmitting apparatus and the receiving apparatus. When determination is made that the correct apparatus is connected, descramble processing is conducted by transmitting to the receiving apparatus the pattern information which restores the scrambled image signal.

A terminal c of the signal selection circuit 123 is connected to a TMDS transmission circuit 125, and a terminal c of a signal selection circuit 124 is connected to a D/A converter 126.

The signal selection circuit 123 is controlled by the protection operating control signal PT from the authentication processing unit 15, and the terminal c is connected either the serial image signal DG which is provided to the terminal a and not encrypted, or the serial image signal DGE which is encrypted and provided to the terminal b, and supplies to the TMDS transmission circuit 125.

The signal selection circuit 124 is also controlled by the protection operating control signal PT from the authentication processing unit 15, and a terminal c is connected either the unscrambled serial image signal DG provided to the terminal a, or the scrambled serial image signal DGS provided to the terminal b, to provide to the D/A converter 126.

The TMDS transmission circuit 125 operates encoding processing for the image signal selected at the signal selection circuit 123, exerts balancing of direct current level or minimizing the number of inversion of logical level, and converts to the three primary-color serial transmission signal SD suitable for transmission. This serial transmission signal SD is outputted to the transmission line 30 from the connector 16. A horizontal synchronizing signal or a vertical synchronizing signal of the serial image signal DG is inserted during blanking period of the serial image signal DG in, for example, blue color, and transmitted.

The D/A converter 126 converts the image signal selected at the signal selection circuit 124 to the analog three primary-color image signal SCP. This analog three primary-color image signal SCP produced at this D/A converter 126 is outputted to the transmission line 30 from the connector 16.

The protection information detecting unit 13 generates the determination signal PD as described above and provides to the authentication processing unit 15. The authentication processing unit 15 conducts authentication processing with the receiving apparatus 40, or generates the signal generation control signal GC or the protection operating control signal PT.

In such configured transmitting apparatus 10, when the protection information detecting unit 13 determines that the contents are not protected by copyright and the serial image signal DG has no copyright protection information, or copyright protection information indicates not to conduct copy-protect operation, the authentication processing unit 15 generates the protection operating control signal PT according to the determination signal PD and connects the terminals c of the signal selection circuit 123 and 124 to the terminal a according to this protection operating control signal PT. At this time, the serial image signal DG which is not encrypted is provided to the TMDS transmission circuit 125, and the serial image signal DG which is not scrambled is provided to the D/A converter 126. Due to these operations, the receiving apparatus 40 may display the image of the contents with the optimum resolutions and the number of colors. Additionally, the receiving apparatus 40 may record the image of the contents on a recording medium by using the outputted analog three primary-color signal.

When the protection information detecting unit 13 determines that the contents are protected by copyright and copy-protect should be conducted for the serial image signal DG according to copyright protection information, the authentication processing unit 15 generates the protection operating control signal PT according to the determination signal PD and connects the terminals c of the signal selection circuit 123, 124 to the terminals b according to this protection operating control signal PT. At this time, the encrypted image signal DGE is provided to the TMDS transmission circuit 125, and the scrambled image signal DGS is provided to the D/A converter 126. Due to these operations, when the image of the contents is displayed according to the serial transmission signal SD outputted from the TMDS transmission circuit 125, the receiving apparatus, if it has not the correct encryption key KC, may not display the correct image by decoding the encrypted image signal DGE, thereby capable of protecting copyright. Furthermore, when the image of the contents is displayed by using the analog three primary-color image signal SCP outputted from D/A converter 126, the receiving apparatus, if it has no descramble function, may not display the correct image, thereby capable of protecting copyright.

The above described first configuration protects copyright by scrambling the analog three primary-color image signal. Alternatively, the present invention may be configured like a second configuration shown in FIG. 4 wherein the scramble circuit 122 is excluded from the first configuration shown in FIG. 3, so as not to provide the image signal to the terminal b of the signal selection circuit 124.

Figure 4:
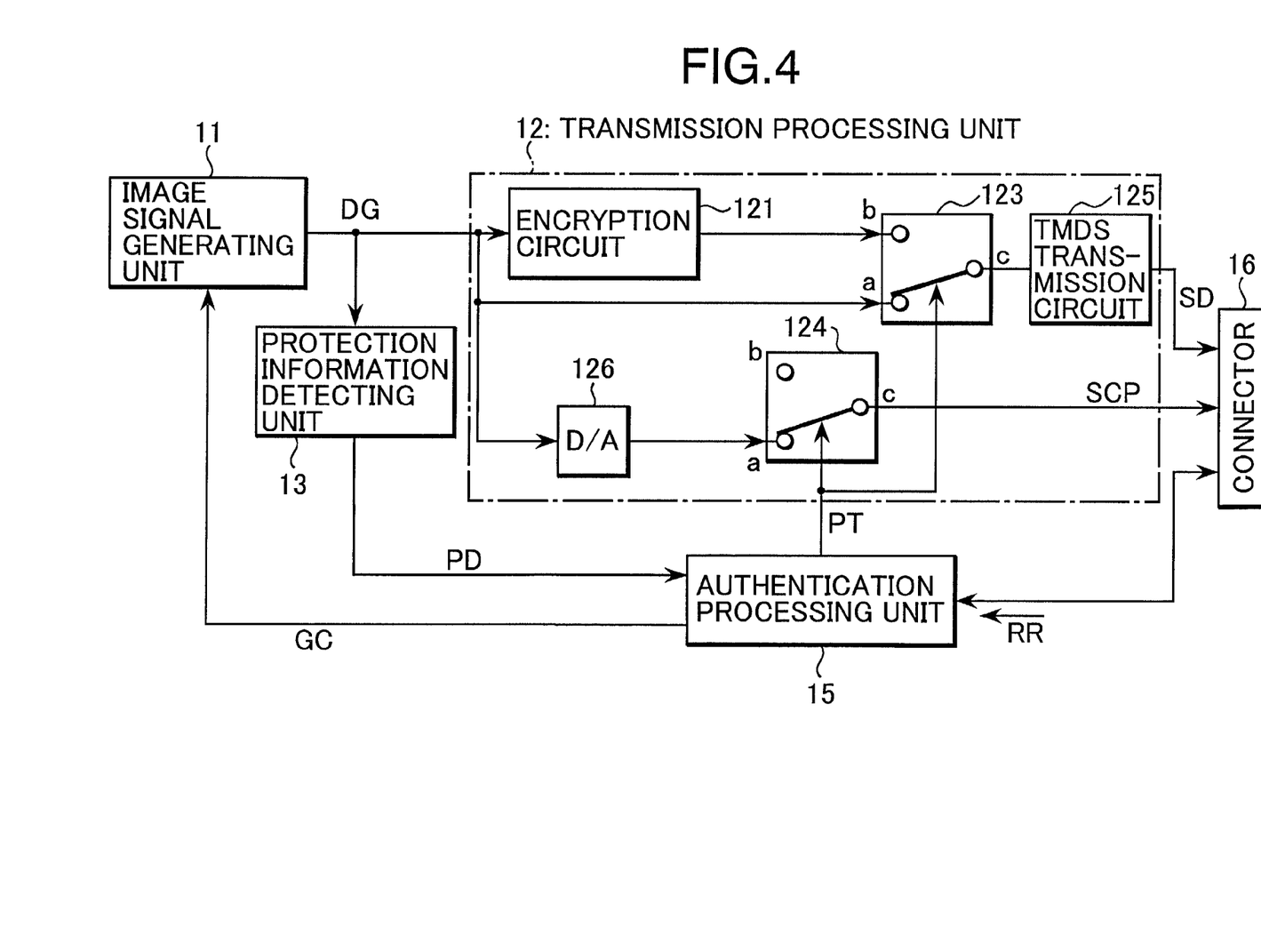
FIG. 4 is a view showing a second configuration of the transmitting apparatus.

On the occasion of conducting copy-protect operation for the image signal DG of the contents in this second configuration, when the terminal c of the signal selection circuit 124 is connected to the terminal b by the protection operating control signal PT, the analog three primary-color image signal SCP may not be outputted from the transmitting apparatus 10 because the image signal is not provided to the terminal b, thereby capable of protecting copyright with inexpensive configuration.

There is described the receiving apparatus 40 which receives the serial transmission signal SD supplied via the transmission line of the DVI Standard to display the image, and generates and outputs the analog image signal.

Figure 5:
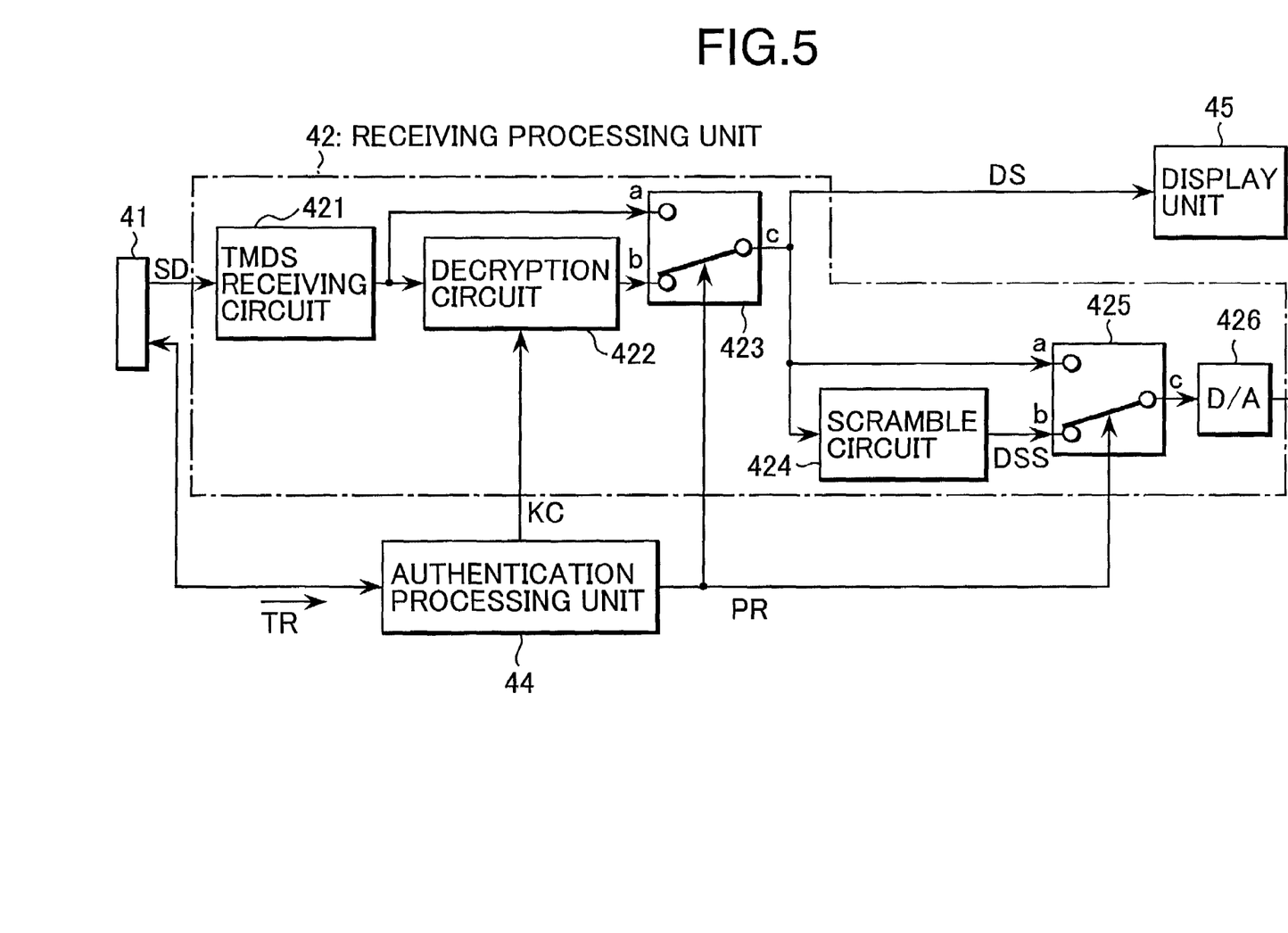
FIG. 5 is a view showing a first configuration of the receiving apparatus.

FIG. 5 shows a first configuration of the receiving apparatus 40. A connector 41 is connected to the TMDS receiving circuit 421 of the receiving processing unit 42 as well as to the authentication processing unit 44. The TMDS receiving circuit 421 conducts decoding processing and restores the serial transmission signal SD, which is conducted with balancing of direct current level or minimizing the number of inversion of logical level, to the original serial image signal, and provides to a decryption circuit 422 and the terminal a of a signal selection circuit 423.

The decryption circuit 422 conducts decoding processing to decrypt the encrypted serial image signal supplied from a TMDS receiver by using the encryption key KC provided from the authentication processing unit 44. The serial image signal produced by this decoding processing and not encrypted is provided to the terminal b of the signal selection circuit 423.

The terminal c of the signal selection circuit 423 is connected to a display unit 45, a scramble circuit 424 and a terminal a of a signal selection circuit 425. The signal selection circuit 423 is controlled by the protection operating control signal PR supplied from the authentication processing unit 44, and the terminal c is connected to the image signal from the TMDS receiving circuit 421 or either one of the image signals from the decryption circuit 422 to provide to the display unit 45 or the like as the three primary-color serial image signal DS.

The display unit 45 displays the image according to the serial image signal DS selected at the signal selection circuit 423. The scramble circuit 424 conducts scramble processing for the serial image signal DS selected at the signal selection circuit 423 to provide to the terminal b of the signal selection circuit 425 as the three primary-color serial image signal DSS.

A terminal c of the signal selection circuit 425 is connected to a D/A converter 426 and selects either the serial image signal DS selected at the signal selection circuit 423 or the serial image signal DSS outputted from the scramble circuit 424 to supply to the D/A converter 426. The signal selection circuit 425 is controlled by the protection operating control signal PR in the same way as the signal selection circuit 423.

The D/A converter 426 converts the serial image signal selected at the signal selection circuit 425 to the analog three primary-color image signal SCP and outputs.

The authentication processing unit 44, by communicating with the authentication processing unit 15 of the transmitting apparatus 10, determines whether the serial transmission signal SD supplied via the transmission line 30 is the serial image signal of the image signal protected by copyright. According to the result of determination, the authentication processing unit 44 provides the decryption circuit 422 with the encryption key KC or generates the protection operating control signal PR.

In such configured receiving apparatus 40, when the authentication processing unit 44 determines that, through communication between the authentication processing unit 44 and the authentication processing unit 15 of the transmitting apparatus 10, the contents transmitted from the transmitting apparatus 10 to the receiving apparatus 40 are not protected by copyright, and the serial image signal DG has been transmitted without being encrypted, the terminals c of the signal selection circuit 423, 425 are connected to the terminals a by the protection operating control signal PR. In this case, the serial image signal DS which is not encrypted and produced by decoding processing at the TMDS receiving circuit 421 is provided to the display unit 45 and to the D/A converter 426, so that the image of the contents may be displayed with the optimum resolutions on the display unit 45. The unscrambled analog three primary-color image signal SCP may be outputted from the D/A converter 426. By communication between the authentication processing unit 44 and the authentication processing unit 15 of the transmitting apparatus 10, the contents transmitted from the transmitting apparatus 10 to the receiving apparatus 40 are protected by copyright. When the authentication processing unit 44 has determined that the encrypted serial image signal DGE is transmitted, the authentication processing unit 44 connects the terminals c of the signal selection circuits 423, 425 to the terminals b by the protection operating control signal PR and provides the decryption circuit 422 with the encryption key KC, thereby decoding at the decryption circuit 422 the image signal produced by decoding processing at the TMDS receiving circuit 421. Because of this, the serial image signal DS which is not encrypted and produced at the decryption circuit 422 is provided to the display unit 45 and the scramble circuit 424.

The scramble circuit 424 scrambles and outputs the serial image signal DSS which is not encrypted. Because the terminal c of the signal selection circuit 425 is connected to the terminal b by the protection operating control signal PR, the scrambled serial image signal DSS is supplied to the D/A converter 426 and outputted therefrom as the analog three primary-color image signal SCP. Thus, when the contents are protected by copyright, the analog three primary-color image signal SCP is in the state of being scrambled so that the image of the contents may not be correctly recorded or displayed, which makes it possible also for the analog image signal to be protected by copyright. According to the first configuration of the receiving apparatus 40, copyright is to be protected by scrambling the analog three primary-color image signal SCP, but like the second configuration shown in FIG. 6, the scramble circuit 424 may be excluded from the configuration shown in FIG. 5 so as that the image signal is not provided to the terminal b of the signal selection circuit 425.

Figure 6:
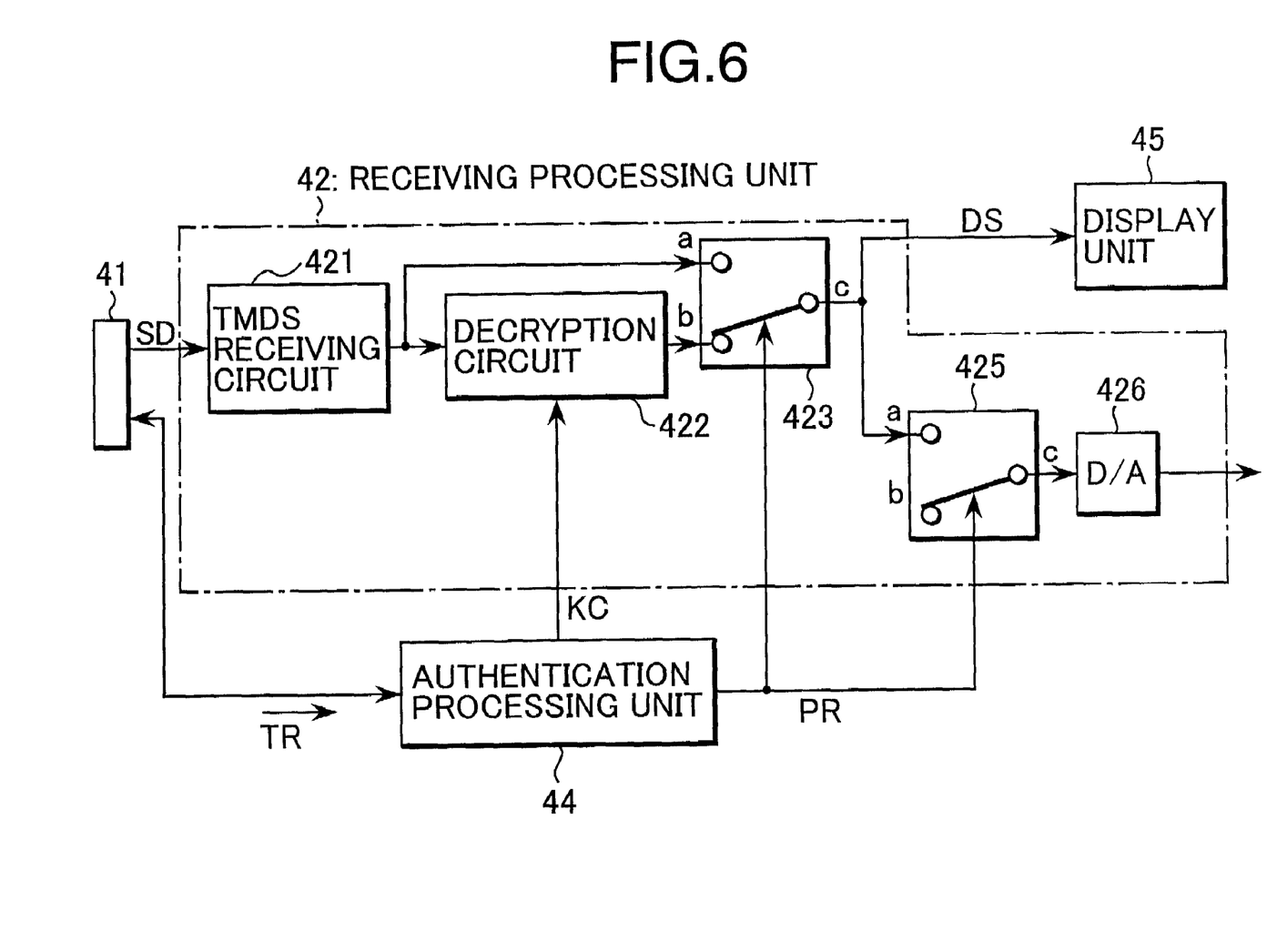
FIG. 6 is a view showing a second configuration of the receiving apparatus.

According to the second configuration, on the occasion that the contents are protected by copyright, where the terminal c is connected to the terminal b in accordance with the protection operating control signal PR, the analog three primary-color image signal SCP is not outputted from the receiving apparatus 40. Because the image signal is not provided to the part of the terminal b, it is possible for the analog image signal to be protected by copyright with an inexpensive configuration.

Moreover, according to the first and the second configurations of the above-described receiving apparatus 40, the analog three primary-color image signal SCP is to be outputted, but it may also be outputted after being converted to the composite video signal in the NTSC (the National Television System Committee) system or the PAL (phase alternation by line) system, so that the analog image signal outputted from the receiving apparatus 40 may easily be recorded on the video tape-recorder or the like.

Figure 7:
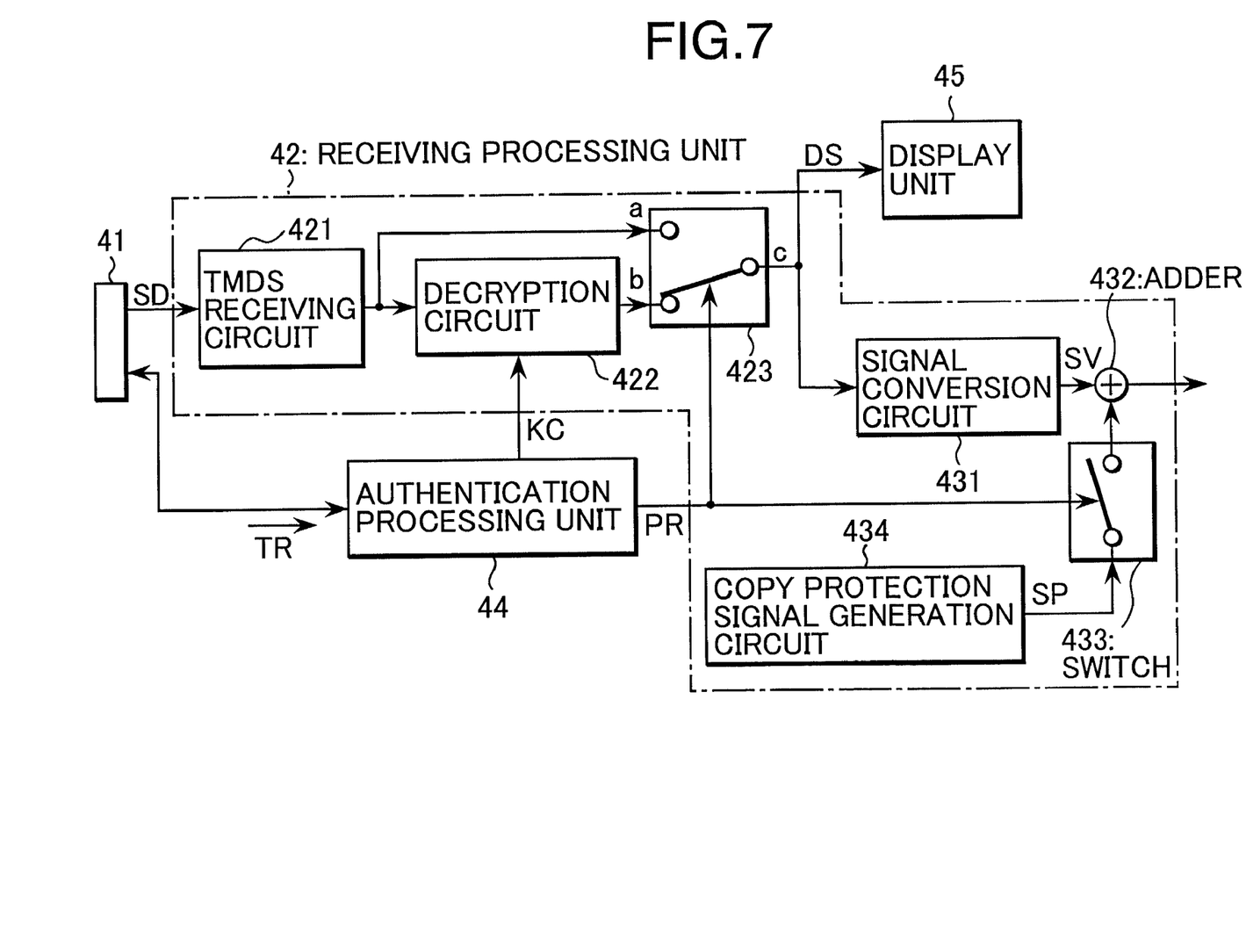
FIG. 7 is a view showing a third configuration of the receiving apparatus.

As a third configuration of the receiving apparatus 40, FIG. 7 shows the configuration of outputting the composite video signal. To a connector 41 the TMDS receiving circuit 421 in the receiving processing unit 42 and the authentication processing unit 44 are connected. The TMDS receiving circuit 421 decodes the serial transmission signal SD, restores to the digital image signal and provides to the decryption circuit 422 and the terminal a of the signal selection circuit 423.

The decryption circuit 422 conducts decoding processing to decrypt the encrypted serial image signal supplied from the TMDS receiving circuit by using the encryption key KC provided from the authentication processing unit 44. The serial image signal which is not encrypted and produced by this decoding processing is supplied to the terminal b of the signal selection circuit 423.

The terminal c of the signal selection circuit 423 is connected to the display unit 45 and a signal conversion circuit 431. The signal selection circuit 423 is controlled by the protection operating control signal PR from the authentication processing unit 44, and the terminal c is connected to the image signal from the TMDS receiving circuit 421 or either one of the image signals from the decryption circuit 422 to provide to the display unit 45 or the like as the three primary-color serial image signal DS.

The display unit 45 displays the image according to the serial image signal DS selected at the signal selection circuit 423. Moreover, the signal conversion circuit 431 converts the serial image signal DS selected at the signal selection circuit 423 to the composite video signal SV in the NTSC system or the PAL system to supply to an adder 432.

To this adder 432 is connected via a switch 433 a copy-guard signal generation circuit 434, which generates the copy-guard signal SP to protect a copy for the contents of the composite video signal SV. For this copy-guard signal SP, for instance, a macrovision signal developed by Macrovision Corporation in USA or the like may be used.

The switch 433 is ON-OFF controlled by the protection operating control signal PR from the authentication processing unit 44. When the switch 433 is in OFF position (non-conducting state), the copy-guard signal SP is outputted from the adder 432 without being superimposed on the composite video signal SV produced at the signal conversion circuit 431, and when the switch 433 is in ON position (conducting state), the copy-guard signal SP is superimposed at the adder 432 on the composite video signal SV produced at the signal conversion circuit 431 and outputted.

The authentication processing unit 44, by communicating with the authentication processing unit 15 of the transmitting apparatus 10, determines whether the serial transmission signal SD supplied via the transmission line 30 is the serial signal of the image signal protected by copyright. According to the result of determination, the authentication processing unit 44 provides the decryption circuit 422 with the encryption key KC, or generates the protection operating control signal PR.

In such configured receiving apparatus 40, when the authentication processing unit 44 determines that, through communication between the authentication processing unit 44 and the authentication processing unit 15 of the transmitting apparatus 10, the contents transmitted from the transmitting apparatus 10 to the receiving apparatus 40 are not protected by copyright, and the serial image signal DG has been transmitted without being encrypted, the terminal c of the signal selection circuit 423 is connected to the terminal a by the protection operating control signal PR, and the switch 433 is put to OFF position. At this time, the serial image signal DS which is not encrypted and produced by decoding processing at the TMDS receiving circuit 421 is provided to the display unit 45 and to the signal conversion circuit 431, so that the image of the contents may be displayed with the optimum resolutions on the display unit 45. In addition, the copy-guard signal SP is outputted without being superimposed at the adder 432 on the composite video signal SV produced at the signal conversion circuit 431, so that the image of the contents may be correctly recorded on the video tape-recorder or the like.

By communication between the authentication processing unit 44 and the authentication processing unit 15 of the transmitting apparatus 10, the authentication processing unit 44 determines that the contents transmitted from the transmitting apparatus 10 to the receiving apparatus 40 are protected by copyright and the encrypted serial image signal DGE is transmitted, the authentication processing unit 44 sets the signal selection circuit 423 to connect the terminal c and the terminal b by the protection operating control signal PR, and puts the switch 433 to ON position, and further provides the decryption circuit 422 with the encryption key KC, thereby decoding at the decryption circuit 422 the image signal which is produced by decoding processing at the TMDS receiving circuit 421. The serial image signal DS produced by conducting decoding processing at this decryption circuit 422 is supplied to the display unit 45 and the signal conversion circuit 431 to display the image of the contents at the display unit 45. Furthermore, the copy-guard signal SP is superimposed at the adder 432 on the composite video signal SV generated at the signal conversion circuit 431 so that image of the contents are prevented from being recorded properly on the video tape-recorder or the like.

Thus, when the contents are protected by copyright, by superimposing the copy-guard signal on the composite video signal SV outputted from the receiving apparatus 40, copyright protection for the analog image signal may be conducted.

According to the first, second and third configurations of the receiving apparatus 40 described above, the copyright protection operation is to be conducted by determining whether the contents are protected by copyright, through the communication between the authentication processing unit 44 and the authentication processing unit 15 of the transmitting apparatus 10. Alternatively, a trigger signal for controlling operation of copyright protection for the analog image signal may be multiplexed with the transmitting image signal and transmitted, and copyright protection for the analog image signal is conducted by detection of this trigger signal.

Figure 8:
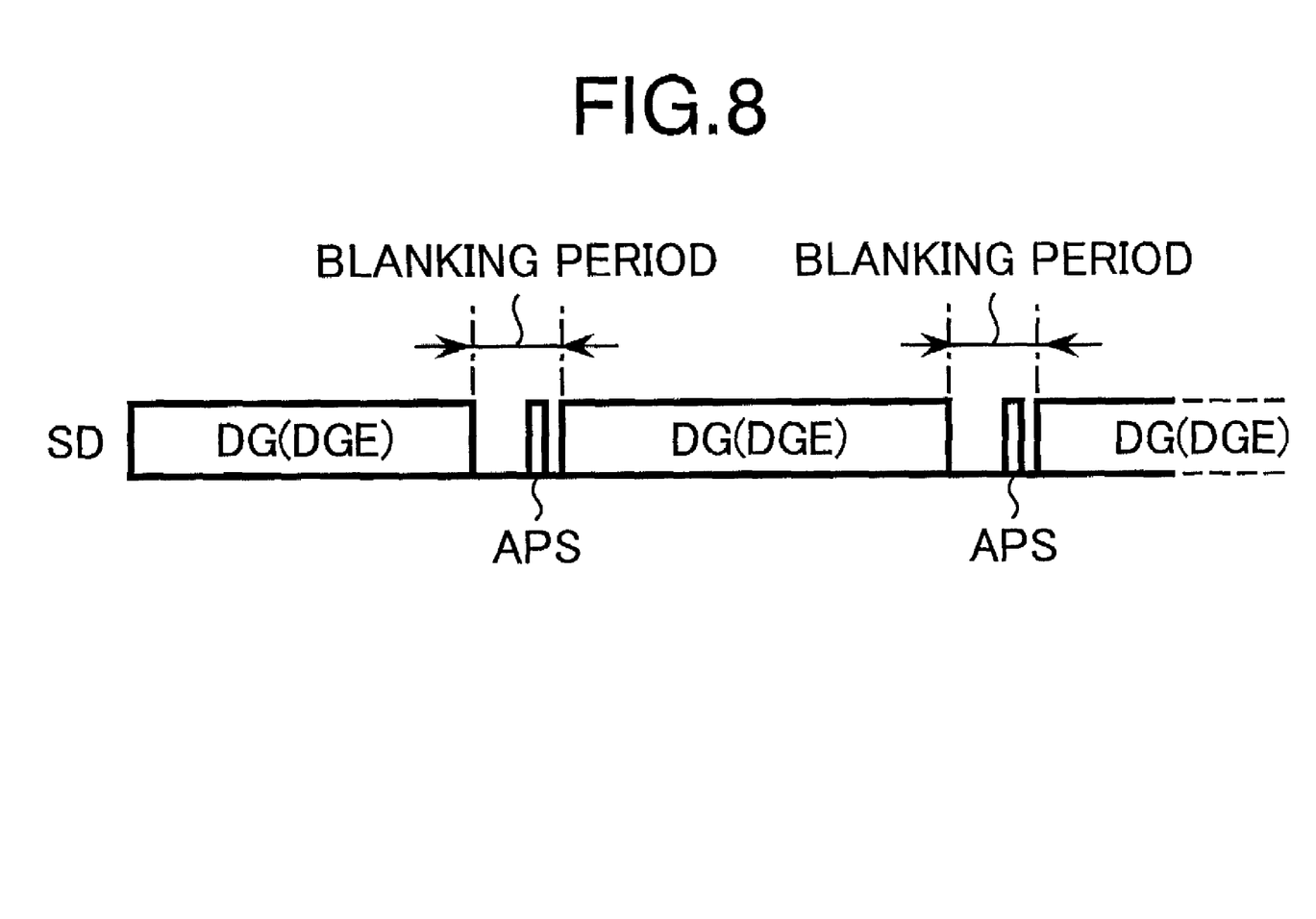
FIG. 8 is a view showing a transmission signal multiplexed with copyright protection information.
Figure 9:
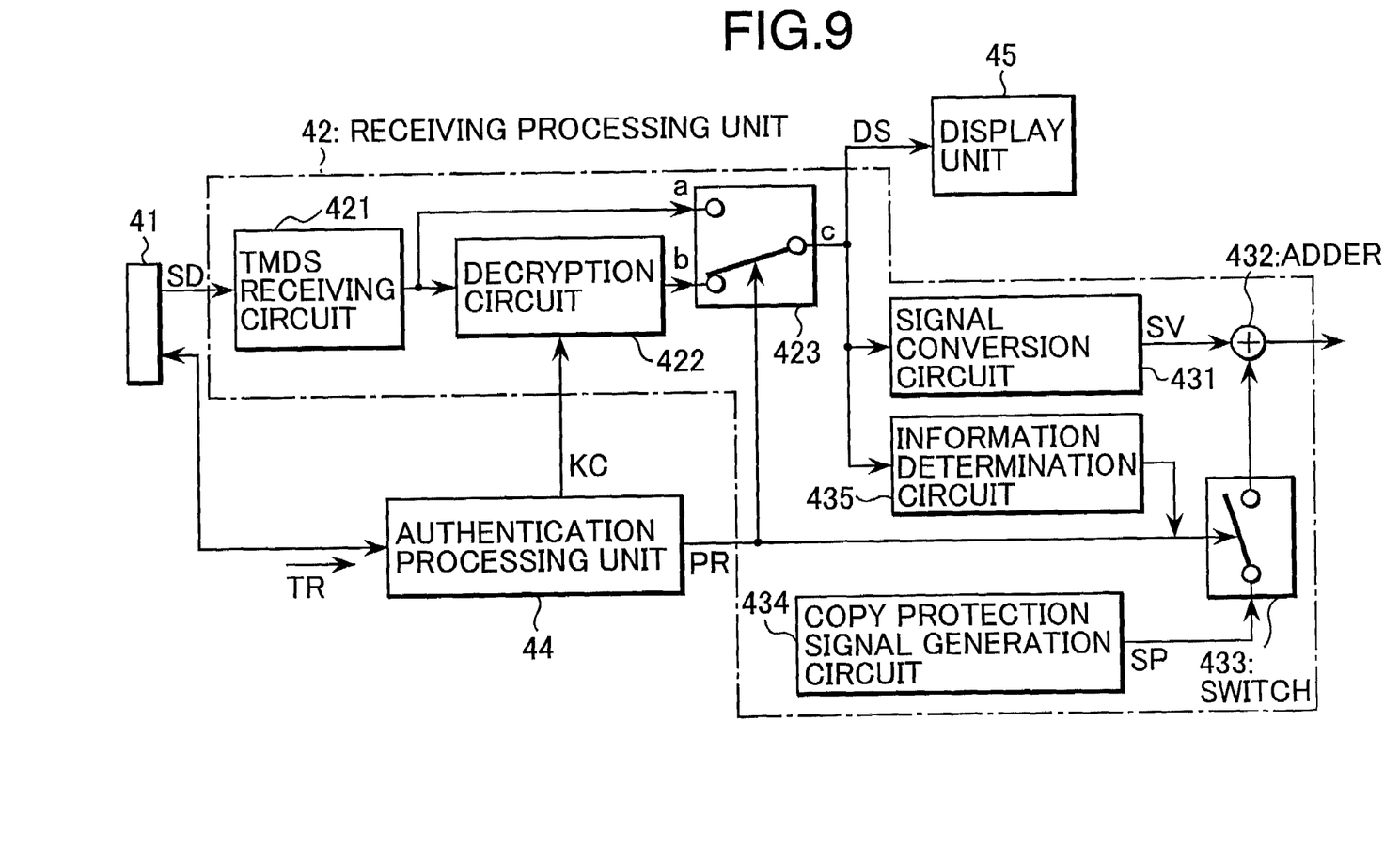
FIG. 9 is a view showing a fourth configuration of the receiving apparatus.

FIG. 8 shows the serial transmission signal SD in which the trigger signal for controlling operation of copyright protection for the analog image signal is multiplexed into the image signal. In this serial transmission signal SD, there is shown the case where an APS signal is multiplexed as the trigger signal during the blanking period for the serial image signal DG (DGE) transmitted with, for example, the base band. FIG. 9 shows a configuration of a receiving apparatus capable of performing copyright protection operation for the analog image signal by receiving the serial transmission signal SD shown in FIG. 8.

To the connector 41 are connected the TMDS receiving circuit 421 in the receiving processing unit 42 and the authentication processing unit 44. The TMDS receiving circuit 421 decodes the serial transmission signal SD, restores to the digital image signal, and provides to the decryption circuit 422 and the terminal a of the signal selection circuit 423.

The decryption circuit 422 conducts decoding processing for the image signal supplied with being encrypted by the encryption key KC supplied from the authentication processing unit 44. The image signal which is not encrypted and produced by this decoding processing is supplied to the terminal b of the signal selection circuit 423.

The terminal c of the signal selection circuit 423 is connected to the display unit 45, the signal conversion circuit 431, and an information discriminating circuit 435. Moreover, the signal selection circuit 423 is controlled by the protection operating control signal PR from the authentication processing unit 44.

The display unit 45 displays the image according to the serial image signal DS selected at the signal selection circuit 423. Moreover, the signal conversion circuit 431 converts the serial image signal DS selected at the signal selection circuit 423 to the composite video signal SV in the NTSC system or the PAL system to supply to the adder 432.

This adder 432 superimposes the copy-guard signal SP on the composite video signal SV, when this copy-guard signal SP is supplied from a copy-guard signal generation circuit 434 via the switch 433.

The switch 433 is ON-OFF controlled by the protection operating control signal PR from the authentication processing unit 44 and a protection operating control signal PQ supplied from an information determination circuit 435.

The information determination circuit 435 determines whether the APS signal is superimposed during the blanking period of the serial image signal DG (DGE) transmitted with the base band, and according to the result of determination, it generates the protection operating control signal PQ to supply to the switch 433.

The authentication processing unit 44, by communicating with the authentication processing unit 15 of the transmitting apparatus 10, determines whether or not the serial transmission signal SD supplied via the transmission line 30 is the serial signal of the image signal protected by copyright. According to the result of determination, the authentication processing unit 44 provides the decryption circuit 422 with the encryption key KC, or generates the protection operating control signal PR.

In such configured receiving apparatus 40, when the authentication processing unit 44 determines that, through communication between the authentication processing unit 44 and the authentication processing unit 15 of the transmitting apparatus 10, the contents transmitted from the transmitting apparatus 10 to the receiving apparatus 40 are not protected by copyright, and the serial image signal DG has been transmitted without being encrypted, the terminal c of the signal selection circuit 423 is connected to the terminal a by the protection operating control signal PR. Furthermore, when the APS signal is not detected at the information determination circuit 435, the switch 433 is put to the OFF position by the protection operating control signal PR and the protection operating control signal PQ generated at the information determination circuit 435. At this time, according to the serial image signal DS which is not encrypted and produced by decoding operation at the TMDS receiving circuit 421, the image of the contents is displayed with the optimum resolutions at the display unit 45. Moreover, at the adder 432, the copy-guard signal SP is outputted without being superimposed on the composite video signal SV produced at the signal conversion circuit 431, the image of the contents may be correctly recorded on the video tape-recorder or the like.

When the contents transmitted from the transmission apparatus 10 to the receiving apparatus 40 are determined as protected by copyright, the authentication processing unit 44 connects the terminal c of the signal selection circuit 423 to the terminal b in accordance with the protection operating control signal PR as well as putting the switch 433 to the ON position. Furthermore, the authentication processing unit 44 provides the decryption circuit 422 with the encryption key KC, and decodes at the decryption circuit 422 the image signal produced by decoding processing at the TMDS receiving circuit 421. Hence, the serial image signal DS which is not encrypted and produced at the decryption circuit 422 is supplied to the display unit 45 and the image of the contents is displayed.

The switch 433 is put to the ON position by the protection operating control signal PR, and the copy-guard signal SP is, at the adder 432, superimposed on the composite video signal SV generated at the signal conversion circuit 431, so that the contents may be prevented from being recorded with the good image on the video tape-recorder the like.

When the APS signal is inserted to the image signal of the contents and provided to the receiving apparatus 40, the APS signal is detected at the information determination circuit 435 and the switch is turned to the ON position, by the protection operating control signal PQ. Hence, even only for the APS signal which controls the copyright protection operation of the analog image signal, the copy-guard signal SP is, at the adder 32, superimposed on the composite video signal SV, thereby performing the copyright protection operation of the analog image signal. Thus, even by insertion of only the APS signal into the image signal to be transmitted, the copyright protection operation may correctly be performed.

Figure 10:
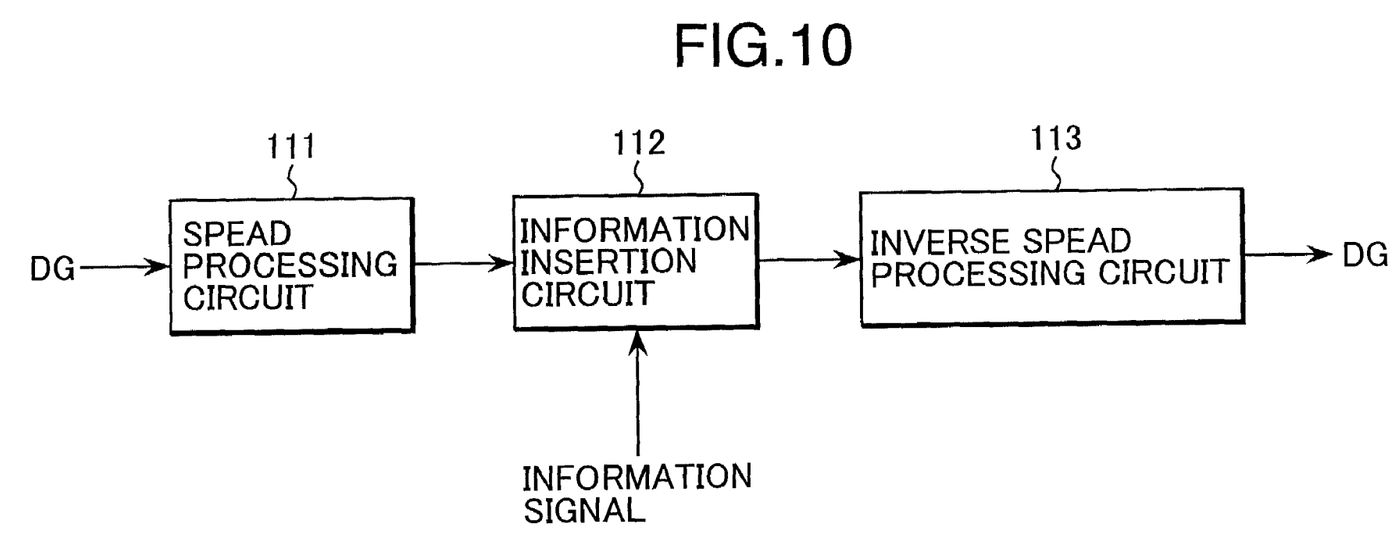
FIG. 10 is a view explaining embedding of copyright protection information.

Furthermore, copyright protection information may be embedded into the image signal by using a Digital Watermark technology. For instance, in the image signal generating unit 11, the serial image signal DG is provided to a spread processing circuit 111 as shown in FIG. 10 to broaden a frequency bandwidth of a spectrum component as well as to perform convolution of information signal indicating copyright protection information operation at an information insertion circuit 112, and provides a reverse-spread processing circuit 113 with the signal which convolutes this information signal. The reverse-spread processing circuit 113, by reducing the frequency bandwidth of the spectrum component of the signal which convolutes the information signal, restores the information signal to the original image signal. At this time, the spectrum of information signal indicating copyright protection information is spread to the image signal, so that tampering copyright protection information operation may be prevented.

Thus, when copyright protection information is embedded in the image signal by utilizing the Digital Watermark technology, the embedded copyright protection information operation may be retrieved by performing spread processing for the image signal at the information determination circuit 435, it may also be good that the switch 433 is to be controlled according to this retrieved copyright protection information operation.

In this way, according to the above-described embodiments, on the occasion of outputting the analog image signal together with transmitting the digital image signal, output control or scramble processing is performed for the analog image signal of the contents according to whether the digital image signal of the contents is encrypted, thereby capable of performing proper copyright protection for the contents.

The above-described receiving apparatus 40 is the one that displays the image of the contents according to the received image signal as well as outputs the analog image signal, but it is as a matter of course that the receiving apparatus 40 is not limited to the apparatus for displaying the image.

According to this invention, the signal transmitting apparatus transmits the digital signal of the contents as well as converts the digital signal to the analog signal to output, or transmits the analog signal together with the digital signal. On that occasion, it determines whether or not the contents are protected by copyright, and, when the contents are determined as protected by copyright, the scramble processing for the analog signal is performed, or output is prohibited, and the copyright protection operation is performed. Hence, even as the case of, for example, the consumer electronics products which not only perform processing of the digital image signal but also have a function of converting the digital image signal to the analog image signal to output, a practical effect of copyright protection for the contents may be exerted.

Determination of whether the contents are protected by copyright is made by retrieving copyright protection information embedded in the digital signal, or by retrieving copyright protection information multiplexed during the blanking period while the digital signal is still the image signal. Accordingly, copyright protection for the analog signal may be performed by making effective use of the transmission line for the digital signal. Additionally, when copyright protection information is embedded in the digital signal, safety transmission may be ensured.

Furthermore, the image signal is converted to the analog composite video signal, and when the contents are determined as protected by copyright, the copy-guard signal is superimposed on the composite video signal, thereby capable of outputting the signal for the NTSC system or the like.

Although the present invention has been described with reference to specific embodiments, those of skill in the art will recognize that changes may be made thereto without departing from the spirit and scope of the invention as set forth in the hereafter appended claims.

We claim as our invention:

1. A signal transmission apparatus for transmitting a digital signal representative of contents of information to be transmitted as well as for converting the digital signal to an analog signal to output, wherein the analog signal is transmitted simultaneously with the digital signal through a single connector, the apparatus comprising:
    a protection detecting part for determining whether the contents are protected by copyright; and
    a transmission processing unit including a copyright protecting part for performing a copyright protection operation that alters the analog signal and the digital signal when the contents are determined as protected by copyright based on a result of the determination conducted by the protection detecting part, and
    a transmitting part for transmitting the copyright protected analog and digital signals through said connector to at least one receiving apparatus.

2. A signal transmission apparatus according to claim 1, wherein the copyright protecting part includes a scrambling part for scrambling the analog signal, the copyright protecting part outputting and transmitting the analog signal scrambled by the scrambling part when the contents are determined as protected by copyright by the protection detecting part.

3. A signal transmission apparatus according to claim 1, wherein the copyright protecting part prohibits outputting and transmitting of the analog signal when the contents are determined as protected by copyright by the protection detecting part.

4. A signal transmission apparatus according to claim 1, wherein determination as to the copyright protection conducted by the protection detecting part is made based on copyright protection information transmitted together with the digital signal.

5. A signal transmission apparatus according to claim 4, wherein the protection detecting part retrieves copyright protection information embedded in the digital signal.

6. A signal transmission apparatus according to claim 4, wherein the digital signal is an image signal, and the protection detecting part retrieves copyright protection information multiplexed during a blanking period of the digital signal.

7. A signal transmission apparatus according to claim 4, wherein the protection detecting part determines that the contents are protected by copyright when a protection operating control signal to control copyright protection operation for an analog signal is transmitted as the copyright protection information.

8. A signal transmission apparatus according to claim 1, wherein determination of the copyright protection by the protection detecting part is based on copyright protection information transmitted via a signal line different from that of the digital signal.

9. A signal transmission apparatus according to claim 8, wherein the protection detecting part determines that copyright is protected when information indicative of the digital signal of the contents being encrypted is regarded as the copyright protection information.

10. A signal transmission apparatus according to claim 1, further comprising:
    a signal converting part for converting a digital signal to an analog composite video signal when the digital signal of the contents is the image signal;
    a signal generating part for generating a copy-guard signal; and
    a signal adding part for superimposing the copy-guard signal on the composite video signal when the protection detecting part determines that the contents are protected by copyright.

11. A signal transmission method comprising the steps of:
    determining whether contents of information to be transmitted are protected by copyright when a digital signal representative of the contents is transmitted; and
    performing a copyright protection operation that alters the digital signal and an analog signal, said analog signal produced by converting the digital signal, when the contents are determined as protected by copyright, before the analog signal is outputted; and transmitting simultaneously the copyright protected analog and digital signals through a single connector to at least one receiving apparatus.

12. A signal transmission method according to claim 11, wherein a scrambling processing is performed for the analog signal as the copyright protection operation.

13. A signal transmission method according to claim 11, wherein one of the outputting and the transmitting of the analog signal is prohibited via the copyright protection operation.

14. A signal transmission method according to claim 11, wherein determination of whether the contents are protected by copyright is made based on copyright protection information transmitted together with the digital signal.

15. A signal transmission method according to claim 14, wherein determination of whether the contents are protected by copyright is made by retrieving copyright protection information embedded in the digital signal.

16. A signal transmission method according to claim 14, wherein the digital signal is an image signal, and determination of whether the contents are protected by copyright is made by retrieving copyright information multiplexed during a blanking period of the digital signal.

17. A signal transmission method according to claim 14, wherein the contents are determined as protected by copyright when a protection operating control signal to control copyright protection operation for the analog signal has been transmitted as the copyright protection information.

18. A signal transmission method according to claim 11, wherein determination of whether the contents are protected by copyright is made based on copyright protection information transmitted via a signal line which is different from that of the digital signal.

19. A signal transmission method according to claim 11, wherein the contents are determined as protected by copyright when the digital signal of the contents is encrypted.

20. A signal transmission method according to claim 11, further comprising the steps of:
    converting an image signal to an analog composite video signal when the digital signal of the contents is an image signal; and
    superimposing a copy-guard signal on the composite video signal when the contents are determined as protected by copyright.

21. A signal transmitting apparatus for transmitting a digital signal representative of contents of information to be transmitted, comprising:
    a conversion part for converting the digital signal to an analog signal to be outputted and transmitted simultaneously with the digital signal through a single connector;
    a protection detecting part for determining whether the contents are protected by copyright;
    a transmission processing apparatus including a copyright protecting part for performing a copyright protection operation that alters the digital signal and the analog signal when the contents are determined as protected by copyright based on a result of the determination conducted by the protection detecting part, and
    a transmitting part for transmitting the copyright protected analog and digital signals through said connector to at least one receiving apparatus.

22. A signal transmission system comprising:
    a signal transmitting apparatus for transmitting a digital signal representative of contents of information to be transmitted, comprising:
    a conversion part for converting the digital signal to an analog signal to be outputted and transmitted simultaneously with the digital signal through a single connector;
    a protection detecting part for determining whether the contents are protected by copyright;
    a transmission processing unit including a copyright protecting part for performing a copyright protection operation that alters the digital signal and the analog signal when the contents are determined as protected by copyright based on a result of the determination conducted by the protection detecting part,
    a transmitting part for transmitting the copyright protected analog and digital signals through said connector to at least one receiving apparatus; and
    a signal receiving apparatus for receiving a digital signal representative of contents of information, comprising:
    an authentication part for determining if the contents are protected by copyright;
    a conversion part for converting a digital signal to an analog composite video signal when the digital signal of the contents is an image signal;
    a signal generating part for generating a copy-guard signal; and
    a signal adding part for superimposing the copy-guard signal on the composite video signal when the authentication part determines that the contents are protected by copyright.

* * * * *